(12) United States Patent
Sarmah

(10) Patent No.: US 10,417,171 B1
(45) Date of Patent: Sep. 17, 2019

(54) CIRCUITS FOR AND METHODS OF ENABLING THE COMMUNICATION OF SERIALIZED DATA IN A COMMUNICATION LINK ASSOCIATED WITH A COMMUNICATION NETWORK

(71) Applicant: Xilinx, Inc., San Jose, CA (US)

(72) Inventor: Mrinal J. Sarmah, Hyderabad (IN)

(73) Assignee: XILINX, INC., San Jose, CA (US)

( * ) Notice: Subject to any disclaimer, the term of this patent is extended or adjusted under 35 U.S.C. 154(b) by 886 days.

(21) Appl. No.: 14/855,232

(22) Filed: Sep. 15, 2015

(51) Int. Cl.
*G06F 13/42* (2006.01)
*G06F 13/40* (2006.01)
*G06F 1/3234* (2019.01)
*G06F 3/06* (2006.01)

(52) U.S. Cl.
CPC ........ *G06F 13/4295* (2013.01); *G06F 1/3253* (2013.01); *G06F 13/4022* (2013.01); *G06F 13/4243* (2013.01)

(58) Field of Classification Search
None
See application file for complete search history.

(56) References Cited

U.S. PATENT DOCUMENTS

| 6,821,029 | B1 | 11/2004 | Grung et al. |
| 8,238,452 | B1 | 8/2012 | Sarmah |
| 9,432,298 | B1* | 8/2016 | Smith ................. H04L 49/9057 |
| 2009/0232499 | A1* | 9/2009 | Sarashina ............ H04J 3/1694 398/63 |

OTHER PUBLICATIONS

Xilinx, Inc., Athavale, A. et al., High-Speed Serial I/O Made Simple, A Designers' Guide, with FPGA Applications, Edition 1.0, Apr. 2005, San Jose, CA USA.
Xilinx, Inc., Videx-4 RocketIO Multi-Gigabit Transceiver, User Guide, UG076, v4.1, Nov. 2, 2008, San Jose, CA USA.

* cited by examiner

*Primary Examiner* — Scott C Sun
(74) *Attorney, Agent, or Firm* — John J. King

(57) ABSTRACT

A circuit for enabling the communication of data in a communication link associated with a data communication network is described. The circuit comprises a data generation circuit configured to receive a plurality of data streams and generate an output data stream; a control signal generator configured to generate synchronization headers; a serializer circuit configured to receive the output data stream from the data generation circuit and the synchronization headers from the control signal generator, wherein the serializer circuit generates, at an output, an output data signal having data of the output data stream and the synchronization headers; and a control circuit configured to control the data generation circuit and the control signal generator, wherein the control circuit enables a selection of the synchronization headers of the output data signal to enable channel alignment of the communication link.

19 Claims, 7 Drawing Sheets

| 66 | 0 | 1 | 0 | 64 bit scrambled data | 0 |
| 66 | 0 | 1 | 0 | 64 bit scrambled data | 0 |
| 66 | 0 | 1 | 0 | 64 bit scrambled data | 0 |
| 66 | 0 | 1 | 0 | 64 bit scrambled data | 0 |
| 66 | 0 | 0 | 1 | 64 bit scrambled data | 0 |

FIG. 8

| 66 | 1 | 1 | 0 | 64 bit scrambled data | 0 |

FIG. 9

| 66 | 0 | 0 | 1 | 64 bit scrambled data | 0 |
| 66 | 1 | 0 | 1 | 64 bit scrambled data | 0 |

FIG. 10

CIRCUITS FOR AND METHODS OF ENABLING THE COMMUNICATION OF SERIALIZED DATA IN A COMMUNICATION LINK ASSOCIATED WITH A COMMUNICATION NETWORK

FIELD OF THE INVENTION

The present invention relates generally to integrated circuit devices, and in particular, to circuits for and methods of enabling the communication of data in a communication link of a communication network.

BACKGROUND OF THE INVENTION

Serial data communication is an important method for transmitting data in integrated circuit devices, and particularly between integrated circuit devices. The use of serial data input/output (I/O) communication results in an overall reduction in system cost due to the reduced board space, enables small form factor pluggable connectors, and leads to simplified board design as compared to devices implementing parallel I/O communication. With the advancement in high speed serial I/O technology, it is possible to achieve throughput on the order of 400-800 Gbps across a serial communication link. While high speed serial I/Os offer significant advantages, the initialization of link partners which share communication links can be challenging. An initialization protocol needs to establish parallel byte boundary alignment, eliminate serial skew between multiple communication links, communicate of the link initialization status to a link partner, and communicate to link errors, for example.

However, significant resources are used when decoding control words during a control word decoding stage of conventional serial data transmission protocols.

Accordingly, circuits that enable the communication of serial data while reducing the resources and power required for the data transmission are desirable.

SUMMARY OF THE INVENTION

A circuit for enabling the communication of data in a communication link associated with a data communication network is described. The circuit comprises a data generation circuit configured to receive a plurality of data streams and generate an output data stream; a control signal generator configured to generate synchronization headers; a serializer circuit configured to receive the output data stream from the data generation circuit and the synchronization headers from the control signal generator, wherein the serializer circuit generates, at an output, an output data signal having data of the output data stream and the synchronization headers; and a control circuit configured to control the data generation circuit and the control signal generator, wherein the control circuit enables a selection of the synchronization headers of the output data signal to enable channel alignment of the communication link.

Another circuit for enabling the communication of data in a communication link associated with a data communication network comprises a deserializer circuit having an input for receiving an input data signal; and a control circuit coupled to the deserializer circuit and having a first input coupled to receive synchronization headers associated with the input signal; wherein the control circuit generates a control signal indicating that a channel initialization is complete based upon the synchronization headers.

A method of enabling the communication of data in a communication link associated with a data communication network is also described. The method comprises enabling a selection of data of a plurality of data streams to generate an output data stream; enabling a selection of synchronization headers associated with data of the output data stream, wherein the selection of synchronization headers enables channel alignment of the communication link; and generating at an output data signal, associated with a transmitter circuit, having data of the plurality data streams and the selected synchronization headers.

Other features will be recognized from consideration of the Detailed Description and the Claims, which follow.

BRIEF DESCRIPTION OF THE DRAWINGS

FIG. 8 is a diagram showing a bit pattern before a remote ready signal is generated;

FIG. 9 is a diagram showing a bit pattern after a remote ready signal is generated;

FIG. 10 is a diagram showing two consecutive data patterns after link initialization;

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

With the continual increase in the serial data rate of communication links, the operating frequency of the parallel interface logic of multiple communication links of a communication channel is continuing to increase proportionately. The increase in parallel interface frequency leads to increase in dynamic power consumption. Accordingly, effort has been made to reduce the dynamic power. The circuits and methods set forth below not only enables defining an initialization sequence of a serial interface so that the overall circuit area of the interface is minimized, resulting in a reduction in dynamic power consumption, but also enable establishing a low cost, high speed serial communication between two transceivers, such as transceivers between two integrated circuit devices, in order to enable high performance computing.

More particularly, the serial communication protocol does not use control word decoding for channel alignment, and performs word boundary alignment, channel alignment and channel verification stages based on the SH bits. Avoiding control word decoding makes the protocol efficient in terms of time and resources for channel alignment. Also, the serial communication protocol exposes the control word type field to the user interface, and can therefore be used to transmit control information to the link partner.

Figure 1:
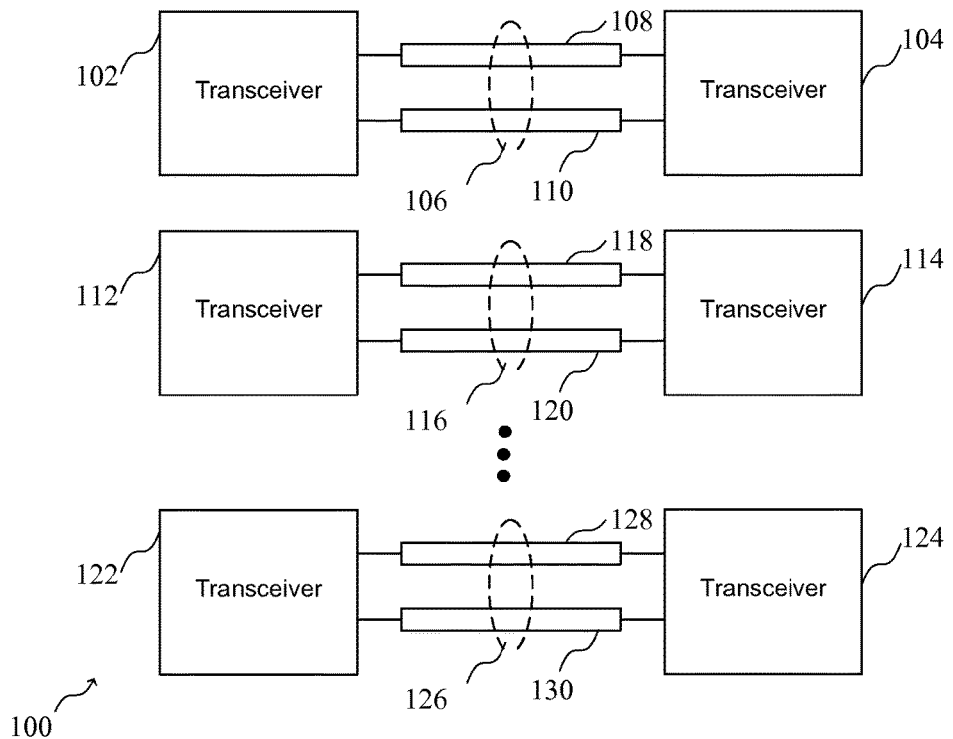
FIG. 1 is a block diagram of a data communication network.

Turning first to FIG. 1, a block diagram of a network 100 enabling the communication of data is shown. In particular, a first transceiver 102 is coupled to a second transceiver 104 by way of communication links 106. The communication link 106 may comprise a first communication link 108 for transmitting data from the first transceiver 102 to the second transceiver 104, while a second communication link 110 may comprise a communication link for transmitting data from the second transceiver 104 to the first transceiver 102. A third transceiver 112 is coupled to a fourth transceiver 114 by way of communication links 116, which may comprise a first communication link 118 for transmitting data from the third transceiver 112 to the fourth transceiver 114, and a second communication link 120 for transmitting data from the fourth transceiver 114 to the third transceiver 112. A fifth transceiver 122 is coupled to an sixth transceiver 124 by way of an nth communication link 126, where n can be any number of serial transceivers necessary to transmit serial data in a group of communication links forming a channel. The communication links 126 may comprise a first communication link 128 for transmitting data from the fifth transceiver 122 to the sixth transceiver 124, and a second communication link 130 for transmitting data from the sixth transceiver 124 to the fifth transceiver 122. Accordingly, it is possible to aggregate multiple serial communication links to achieve higher total bandwidth which meets system requirements, where the data may be Non-Return-to-Zero (NRZ) encoded serial data that is transferred over a differential pair to a serial link partner over a communication link. That is, each of the communication links 106, 108, 116, 118, 126, and 128 can be implemented as a differential pair.

The transceivers 102, 112, and 122 may be in one integrated circuit device, where transmitters of the transceivers 102, 112, and 122 enable the transmission of data in a channel comprising the communication links 108, 118 and 128 to the corresponding receivers of the transceivers 104, 114, and 124 in another integrated circuit device, for example. Similarly, transmitters of the transceivers 104, 114, and 124 may enable the transmission of data in a channel comprising the communication links 110, 120 and 130 to the corresponding receivers of the transceivers 102, 112, and 122. While it is necessary to eliminate the skew arising from asymmetric length across multiple serial links in order to ensure data integrity in the receive side, channel alignment methods are implemented to de-skew the serial links on the receive side, as will be described in more detail below.

Additional details related to transmitters and receivers of the transceivers of FIG. 1 are shown in more detail in FIGS. 3 and 4 below.

Figure 2:
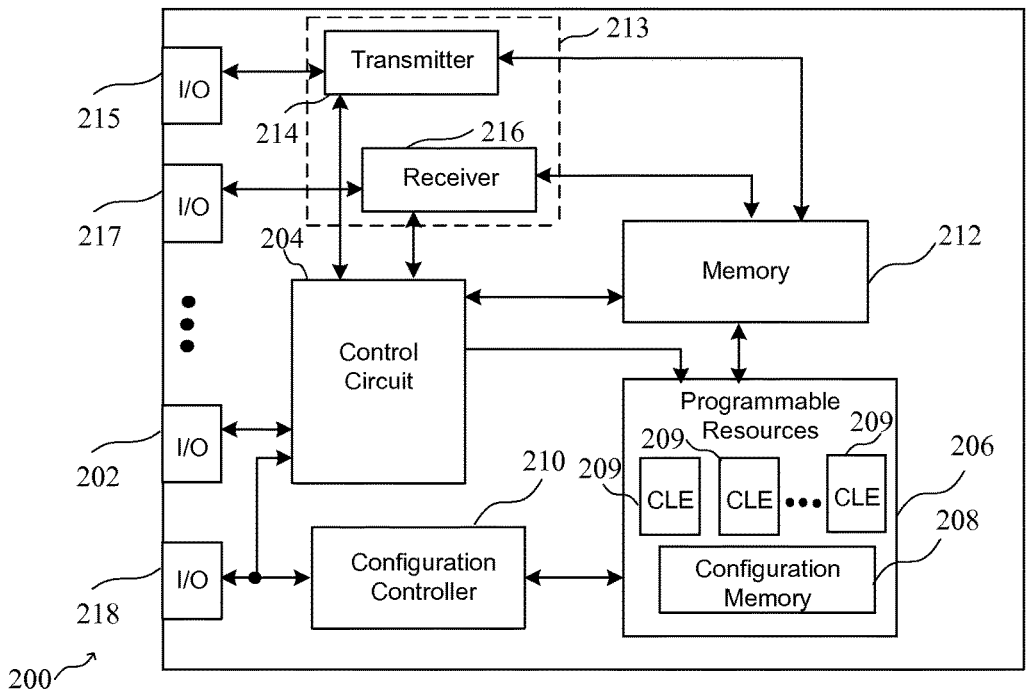
FIG. 2 is a block diagram of an integrated circuit having a transceiver of the circuit of FIG. 1.

Turning now to FIG. 2, a block diagram of integrated circuit device 200 having a transceiver is shown. The integrated circuit device of FIG. 2 could be used to implement a transceiver of FIG. 1, for example, where 2 integrated circuit devices 200 could be implemented on either end of a communication link. An input/output port 202 is coupled to a control circuit 204 that controls programmable resources 206 having configuration memory 208. Configuration data may be provided to the configuration memory 208 by a configuration controller 210. The configuration data enables the operation of configurable elements 209, such as configurable logic elements (CLEs). A memory 212 may be coupled to the control circuit 204 and the programmable resources 206. A transceiver 213 comprises a transmitter 214 coupled to an I/O port 215 and a receiver circuit 216 coupled to an I/O port 217, and may transmit and receive signals as described in more detail below. Other I/O ports may be coupled to circuits of the integrated circuit device, such as I/O port 218 that is coupled to the control circuit 204 as shown. The circuits and methods set forth in more detail below may be implemented within a single integrated circuit die, or may be implemented in a multi-chip module or some other system enabling the transfer of data between integrated circuit devices or other elements.

While devices having programmable resources such as CLEs may be implemented in any type of integrated circuit device, such as an application specific integrated circuit (ASIC) having programmable resources, other devices are dedicated programmable logic devices (PLDs). One type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to that used in a Programmable Logic Array (PLA) or a Programmable Array Logic (PAL) device. Another type of PLD is a field programmable gate array (FPGA). In a typical FPGA, an array of configurable logic blocks (CLBs) having CLEs is coupled to programmable input/output blocks (IOBs). The CLBs and IOBs are interconnected by a hierarchy of programmable routing resources. These CLBs, IOBs, and programmable routing resources are customized by loading a configuration bitstream, typically from off-chip memory, into configuration memory cells of the FPGA. For both of these types of programmable logic devices, the functionality of the device is controlled by configuration data bits of a configuration bitstream provided to the device for that purpose. The configuration data bits may be stored in volatile memory (e.g., static memory cells, as in FPGAs and some CPLDs), in non-volatile memory (e.g., Flash memory, as in some CPLDs), or in any other type of memory cell.

Figure 3:
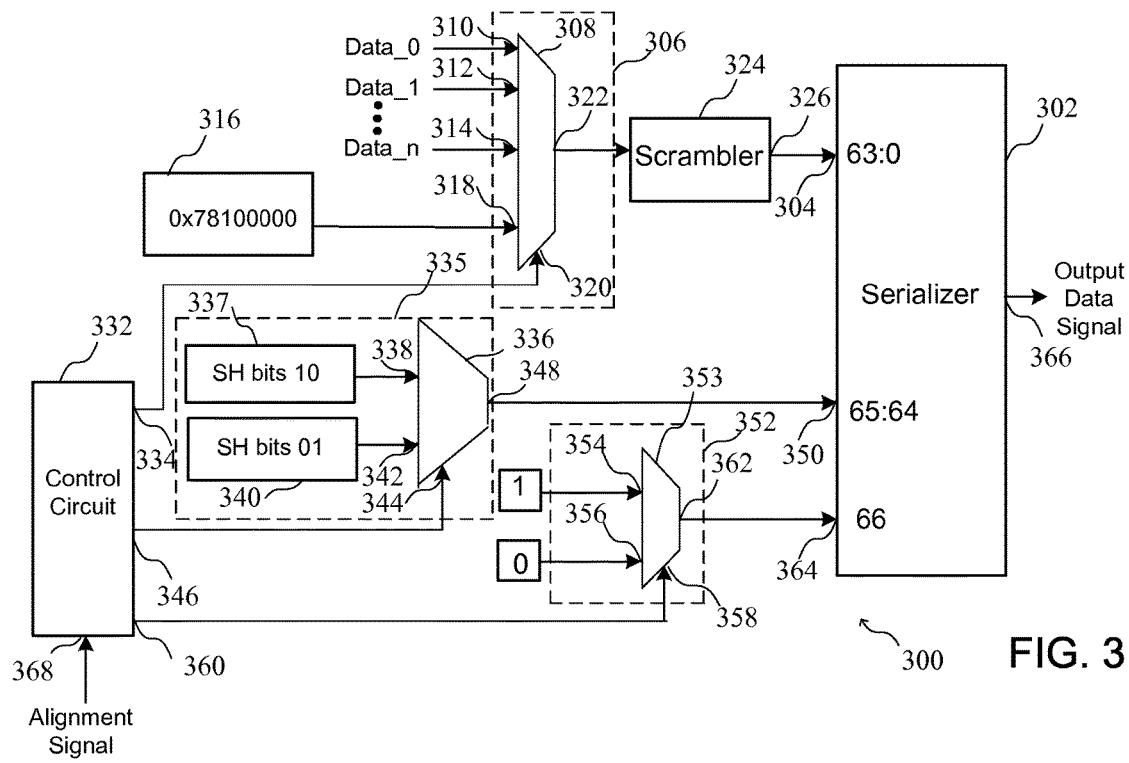
FIG. 3 is a block diagram of a transmitter of the integrated circuit of FIG. 2.

Turning now to FIG. 3, a block diagram of a transmitter of the integrated circuit of FIG. 2 is shown. The transmitter 300 of FIG. 3 operates as a high speed serial transmitter that is responsible for encoding the user data followed by serializing and converting the data to a scrambled NRZ stream. Scrambling is an important part of serial data transmission. Scrambling ensures that the data has sufficient transitions so that the receiver circuit can essentially extract an embedded clock from the data. The circuits and methods set forth below enable the serial transmission lines to be DC balanced, where an encoded data block can have positive or negative running disparity in order to maintain DC balance over the serial links as will be described in more detail below.

An example of an encoding protocol is 64B/66B encoding, which includes two Synchronization Header (SH) bits (10 or 01) in order to differentiate control character from data characters. SH=00 or 11 are defined as invalid SH bits. The control pattern is prepended to the data pattern using a barrel shifting mechanism in the transmitter of the communication link. The encoded data may be passed over to an array of PISO shift registers, where the shift register array is clocked using a local serial clock generated from a phase locked loop a (PLL) block. The serial data is provided to a differential transmitter and the gain of the differential transmitter defines the amplitude of the differential output signal. In order to compensate for the signal loss at higher frequency, the transmitter block may perform an operation called pre-emphasis, where the high frequency components of the signal is boosted compared to a low frequency component in order to compensate for the loss at higher frequency. As will be described in more detail in reference to FIG. 4, a receiver interface in a transceiver extracts the clock from the data, de-serializes the data, performs parallel byte boundary alignment and decodes the received data stream.

Referring specifically to the circuit of FIG. 3, the transmitter 300 of FIG. 3 comprises a serializer circuit 302 having a first data input 304 coupled to receive data from a data generation circuit 306, shown here as a multiplexer 308 coupled to receive a plurality of input data streams (Data_0, Data_1, . . . Data_n) at corresponding inputs 310-314. The serializer circuit 302 of a transmitter associated with a channel may comprise an array of Parallel-In-Serial-Out (PISO) shift registers, while a de-serializer block of a receiver associated with the channel may have an array of Serial-In-Parallel-Out (SIPO) shift registers. Accordingly parallel data of the plurality of input data streams coming from the user protocol layer is serialized by a transmitter of a transceiver 102 before transmitting over the communication link 104.

A fixed value 316 is coupled to an input 318, where one of the data streams or the fixed value 316 is selected by a data control signal coupled to a control input 320. The fixed value 316 is an idle pattern indicating that no data is being sent. An output 322 enables coupling the selected data to a scrambler 324. The scrambler 324 is used to ensure that the transmitted data has a relatively even distribution of 1's and 0's that are generated at an output 326 and coupled to the data input 304 of the serializer circuit. An even distribution of 1's and 0's enables improving DC balancing on the transmission lines.

A control circuit 332 generates, at an output 334, a control signal coupled to the control terminal 320 of the multiplexer circuit 308. The control circuit 332 also controls a control signal generator 335 having a selection circuit 336, shown here as a multiplexer, that is coupled to receive a first synchronization header (SH) 337 at a first input 338 and a second synchronization header 340 at a second input 342. A first SH control signal is coupled to a control terminal 344 of the selection circuit 336, wherein the first SH bits or the second SH bits are selected. As will be described in more detail below, the first SH bits (including 2 bits by way of example in FIG. 4) may be a two-bit value of "10," while the second SH bits may be a two-bit value of "01." An output 348 of the selection circuit 336 is coupled to an input 350 of the serializer circuit 302.

An additional SH bit is also provided to the serializer circuit 302. In particular, a ready verification circuit 352 comprising a selection circuit 353 is coupled to receive a plurality of remote ready verification signals, shown here as a selection circuit implemented as a multiplexer coupled to receive a "1" bit at an input 354 and a "0" bit at an input 356. The selection of the "1" bit or the "0" bit is in response to a second SH control signal received at a control terminal 358 from an output 360 of the control circuit 332. An SH control signal selected from one of the inputs 354 and 356 and generated at an output 362 is coupled to an input 364 of the serializer circuit 302. The output data signal is generated at an output 366. An alignment signal is received at an input 368, enabling the transmitter to determine that a channel is aligned and to change the SH control signals as necessary to transmit data. As will be described in more detail below, the ready verification signal enables indicating that a channel has been aligned during a channel initialization phase, and acts as a parity bit after channel alignment during a channel initialization phase.

Figure 4:
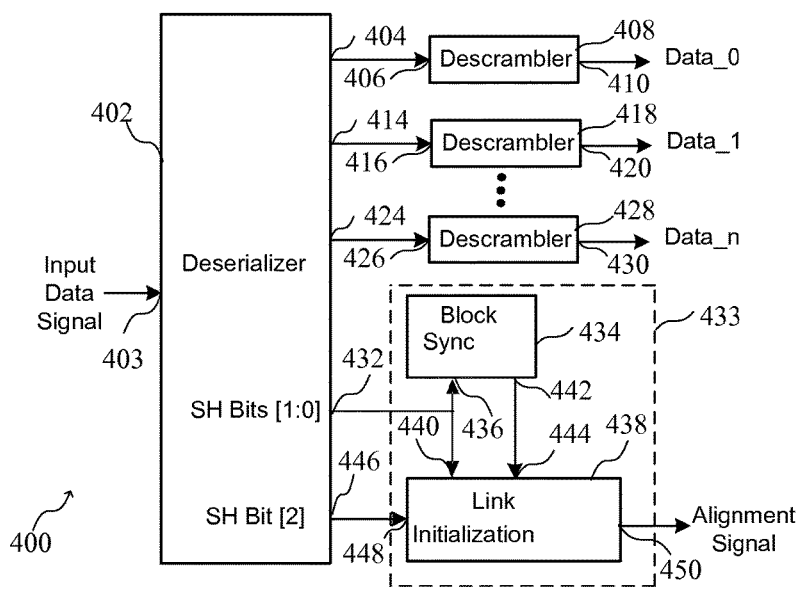
FIG. 4 is a block diagram of a receiver of the circuit of FIG. 2.

Turning now to FIG. 4, a block diagram of a receiver 400 of the circuit of FIG. 2 is shown. In the receiver, the data may be passed through an equalization circuit in order to ensure proper symbol reception at the receiver. The linear equalization defines a linear relation between the input and the output voltage, which may include Decision Feedback Equalization (DFE) as an adaptive mechanism to ensure that the received pattern represents the transmitted symbols. A clock and data recovery (CDR) circuit is provided with a local reference clock. The CDR circuit may use a phase interpolator block to continuously align the clock phase with the incoming symbols. In order to enable CDR to lock to incoming symbols, the incoming symbols need to have sufficient transitions and to enable the CDR to recover the clock from an input stream as defined by a parameter called run-length, which signifies the continuous streams of 1's or 0's that can appear in the serial data stream. Scramblers are implemented in the transmitter to ensure that the number of 1's and 0's in the data stream is balanced as described above.

The de-serialization process involves passing the serial data to a SIPO shift register array, which is clocked with the received recovered clock generated from the CDR circuit. A first step of deserialization provides parallel boundary alignment. The output data from de-serializer block will not be aligned to the parallel byte boundary of the transmitter because of the asynchronous locking of the CDR circuit. Therefore, the deserialization process requires the multiple serial data paths to be aligned to the parallel byte boundary. Comma alignment is a widely-used conventional procedure for parallel byte boundary alignment which involves passing the output from a SIPO shift register array to a barrel shifter, and shifting the data until a pre-defined pattern is detected in the received stream. However, block synchronization according to the methods set forth below is based on the detection of valid SH bits in the received stream, where block lock for a given data channel is indicated after detecting valid SH bits (10 or 01) for a pre-determined number of times. Invalid SH detection is also determined by receiving invalid SH bits for a pre-determined number of times, leading to the de-assertion of the block lock signal. A second phase, known as a decoding phase, involves decoding of the received symbols to valid user data, and particularly de-scrambling the received data after block boundary alignment is achieved.

When transmitting multiple serial data streams in a channel, de-skewing is necessary and involves eliminating the skew arising in different paths. Skew also be caused due to different path lengths or due to Process-Voltage-Temperature (PVT) variation across multiple transceivers forming the serial communication channel. As will be described in more detail below, it is necessary to eliminate skew in the receiver in order to maintain data integrity.

Referring specifically to FIG. 4, a receiver circuit 400 comprises a deserializer circuit 402 coupled to receive an input data signal comprising serial data at an input 403. The deserializer circuit 402 deserializes the serial data to generate a plurality of parallel output data streams based upon a plurality of input data streams provided to a transmitter and serialized. In particular, a first output 404 of the deserializer 402 is coupled to an input 406 of a descrambler circuit 408, where the first data stream Data_0 is generated at an output 410. A second output 414 of the deserializer 402 is coupled to an input 416 of a descrambler circuit 418, where the second data stream Data_1 is generated at an output 420. A third output 424 of the deserializer 402 is coupled to an input 426 of a descrambler circuit 428, where the nth data stream Data_n is generated at an output 430.

Synchronization bits are also generated at outputs of the deserialzer, including the first SH bits (SH Bits [1:0]) comprising a two-bit value, at an output 432 and provided a control circuit 433, and particularly to a block synchronization circuit 434 at an input 436 and a link initialization circuit 438 at an input 440. The block synchronization circuit 434 provides a block locked signal generated at an output 442 and provided to an input 444 of the link initialization circuit 438, as will be described in more detail below. A second synchronization header (SH Bit [2]) representing a remote ready signal is generated at an output 446 and is coupled to the link initialization circuit 438 at an input 448. The use of the first and second SH bits by the block synchronization circuit and the link initialization circuit 438 will be described in more detail below.

An alignment signal is generated at an output 450 of the Link Initialization circuit 438. The alignment signal is generated by the receiver after detecting the necessary bit pattern associated with the synchronization header, and particularly SH [1:0]. The alignment signal is provided to a corresponding transmitter of the transceiver having the receiver of FIG. 4, such as shown as an input to the control circuit in FIG. 3, to enable the transmitter to indicate to the receiver's link partner transmitter that link alignment has been achieved. For example, the receiver of the transceiver 104 could detect the bit pattern of the synchronization header and determine that alignment is achieved. The alignment signal generated by the receiver of the transceiver 104 is provided to the transmitter of the transceiver 104, which generates the appropriate bit pattern of the synchronization bits, such as setting the SH[2] bit, to indicate that alignment has been achieved. The receiver of the transceiver 102 then generates an alignment signal, in response to the indication of alignment from the transmitter of the transceiver 104, to the transmitter of the transmitter of the transceiver 102.

Therefore circuits of FIGS. 3 and 4 provide a serial communication protocol (SCP) that enables establishing chip-to-chip connectivity, where the protocol is defined to perform link initialization and link management. The serial communication protocol defines the data link layer functionality and can support any high speed serial line rate supported by the transceiver. While reference is made to a system transmitting a 67 bit block having a 3 bit synchronization header and a 64 bit field for transmitting data or control words by way of example, it should be understood that the circuits and methods can be implemented using other size synchronization words and fields for transmitting data and control words. As will be described in more detail below, the serial communication protocol enables the monitoring of synchronization header bits to provide block alignment of received data. The user interface of the serial communication protocol is streaming interface wherein data can be transferred using the structural components of the serial communication protocol and no frame delimiters are defined. Having a streaming user interface makes the serial communication protocol suitable for hardware offload use cases where large amounts of data needs to be processed in an off-chip accelerator block.

The serial communication protocol is defined to minimize the initialization time, while optimizing the area occupied by the logic to perform initialization of the serial I/Os and reducing the static and dynamic power consumption. The serial communication protocol is advantageous because it does not use any control word decoding and performs word boundary alignment, channel alignment and channel verification stages based on the SH bits. Avoiding control word decoding makes the protocol efficient in terms of time and resources. The serial communication protocol also exposes the control word type fields to the user interface, enabling the transmission of control information to the link partner, which is beneficial where a peripheral residing at a remote end of the serial communication link requires processor control commands. Unlike conventional point-to-point protocols where processor control commands are transferred in band and a decoding stage at the receiver is required to identify a control word from a data word, the serial communication protocol exposes the SH field to user interface, enable a user to transfer control information with SH bits. That is the serial communication protocol does not require the entire protocol word to be decoded for symbol alignment. Therefore, the serial communication protocol is suitable for any parallel data path width. The serial communication protocol defines link and channel alignment based on detection of SH bits. Choosing a parallel data path boundary which is less than 64 bit enables an efficient implementation of the protocol. The serial communication protocol defines three symbols for link alignment as shown in Table 1:

TABLE 1

| Symbol | Pattern |
| --- | --- |
| Lock | SH[2] = 0 |
|  | SH[1:0] = 10, 10, 10, 10, 01 |
| Idle | SH[2] = 1 |
|  | SH[1:0] = 10 |
|  | DATA[63:32] = 0x78100000 |
|  | DATA[31:0] = 0x00000000 |

As will be described in more detail in reference to FIGS. 5-10, the SH bits are monitored and used for link alignment and channel alignment.

Figure 5:
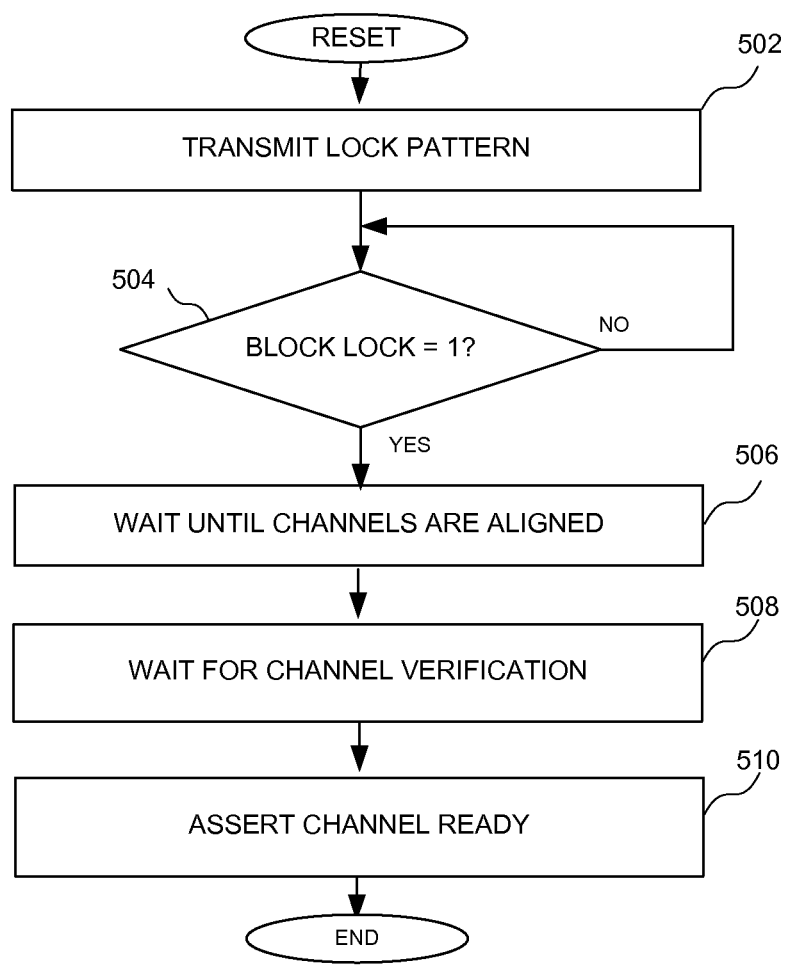
FIG. 5 is a flow chart showing a method of providing link initialization.
Figure 6:
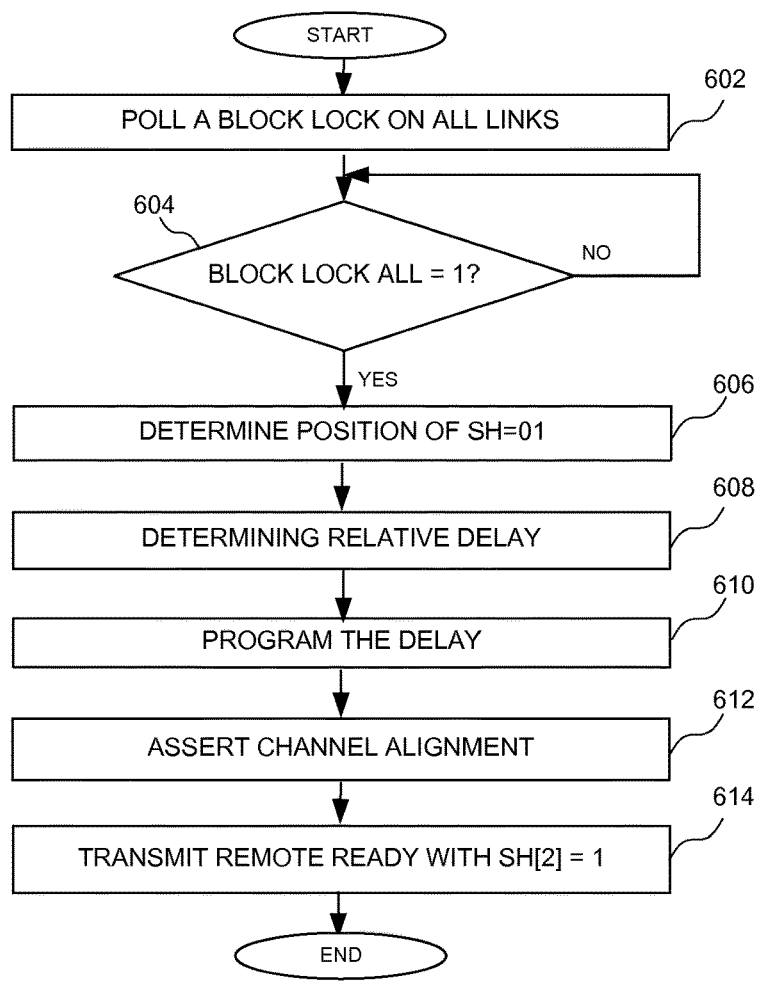
FIG. 6 is a flow chart showing a method of providing channel initialization.

Turning now to FIG. 5, a flow chart shows a method of providing link initialization. Link initialization requires identifying valid sync-header bits for a pre-defined number of times. Once valid sync-header bits are received, a valid boundary can be identified. Therefore, a lock pattern is transmitted to a receiver at a block 502. The lock pattern could be "10, 10, 10, 10, 01," as set forth above in Table 1 and generated in the output data signal of the transmitter of FIG. 3. It is then determined whether a block lock signal is equal to 1 at a block 504. That is, the block lock signal could be generated by the block synchronization circuit 434, and indicates that the lock pattern has been received and link alignment has been achieved. If so, the receiver waits until the different communication links of the channel are aligned at a block 506, and for channel verification at a block 508. Channel alignment ensures that there is no skew between the communication links of a given channel. That is channel verification is performed to verify alignment between all of the communication links of the channel. For example, channel verification checks the patterns on all of the communication links on a channel, where two communication links Link0 and Link1 of a channel that are not aligned may have the pattern of SH bits in the following Example 1:

Link0 SH Bits: 10 10 10 10 01 10 10 10 . . .
Link1 SH Bits: 01 10 10 10 10 01 . . . .

As can be seen, the "01" value is associated with the header of the fifth block received by the receiver associated with Link0, while the "01" value is associated with the sixth block received by the receiver associated with Link1.

However, in the following Example 2:

Link0 SH Bits: 10 10 10 10 01 10 10 10 . . .
Link1 SH Bits: 10 10 10 10 01 10 10 . . . , the "01" bit can be found in the header associated with the fifth block received by each of the receivers. A channel alignment procedure will be described in more detail below in reference to FIG. 6. If the communication links of the channel are aligned and verified, an assert channel ready signal it generated at a block 510. That is, an alignment signal could be generated for each communication link of the channel.

Unlike high speed serial data transfer protocols using 64B/66B encoding for example, where the alignment detection happens with the decoding of a valid control word identified with SH=10, alignment detection according to the serial communication protocol looks for valid boundary alignment once block lock is indicated. During the transmission of control SH (10) bits for block boundary, the serial communication protocol defines transmission of data SH (01) bits to help receiver identify link alignment. That is, rather than having to decode control words that are provided after a synchronization header, the serial communication protocol uses the changes in the synchronization header to establish link alignment. By sending a pattern of synchronization block headers in successive blocks of data, it is possible to detect changes in the synchronization block header to determine alignment. For example, a receiver would be able to align with data transmitted by the transmitter based upon the detection of a synchronization block header of "01" after four synchronization block headers "10." However, it should be understood that other data alignment patterns could be transmitted.

The serial communication protocol also deploys a specific mechanism to de-skew serial links in order to ensure minimum resource utilization. That is, when data is transmitted on a data channel having a plurality of data links, it is necessary to insure that there is no skew between the data links of the data channel, leading to errors in the transmission of data in the data channel. As shown in the flow chart of FIG. 6, a poll for a block lock indicating alignment on each of the communication links is performed at a block 602. If it is determined that a block lock on each of the communication links is achieved, as indicated by a logical "1" for a block lock signal for each of the links, a position of the SH=01 value of the lock pattern is determined for each of the communication links at a block 606. Relative delays for each of the communication links are determined at a block 608 to enable synchronization of the communication links of the channel. Delays are programmed for each of the links at a block 610 based upon the relative delays. Channel alignment is then asserted at a block 612, and a remote ready signal is transmitted with SH[2]=1.

Unlike conventional point-to-point communication protocols where link-to-link skew may be eliminated by adjusting a read pointer of the FIFO used in each link so that the output words from each FIFO are aligned, link-to-link de-skewing is solved by implementing appropriate delays for each of the received links. Each receive word is passed through a programmable delay element and skew is eliminated by computing the relative delay value for each of the received links. Channel alignment is completed once all links are de-skewed and the alignment SH bits are verified. Therefore, the serial communication protocol enables multi-link skew to be detected by using the position of SH bits across multiple links, and deskewing of multiple communication links does not require decoding of channel bonding control words.

Further, unlike conventional communication protocols that require decoding a remote ready control word, the serial communication protocol defines checking the remote readiness status by monitoring another bit in the SH bit-field. Therefore, in addition to the 2 SH bits that can be used to identify control or data words, where "10" is transmitted to indicate that a control word is being transmitted and "01" is transmitted to indicate that data is being transmitted, the serial communication protocol adds a third bit as part of the SH bit field. The third bit is used to communicate remote readiness of a receiver during the initialization process, and can be used to control the running disparity of the next transmit word after link initialization. After link initialization, an inverted scrambling pattern can be transmitted to maintain DC balance across serial links, where the third bit that is used to identify remote readiness of a channel can be used to indicate whether a scrambler pattern has been inverted after the receiver is receiving data.

Therefore, encoding including the additional bit used in the serial communication protocol ensures DC balancing while transferring data over the link. That is, addition to being used as an additional synchronization header bit during link initialization to indicate remote readiness, the additional bit can also be used as a parity bit after a remote ready signal is provided. Initially after link initialization, the additional bit functioning as a parity bit is set as 0. The transmitter calculates the difference between number of 1's and 0's of the scrambled word. If the number of 1's is more than number of zeros, then disparity is positive. In that case, bit 66 is set as 0. If number of 1's is less than number of 0's, disparity is negative. In that case, the transmitter inverts each bit of the data or control word and sets bit 66 as 1. That is, the additional bit is used to convey the information (i.e. indicates whether or not the data or control word is inverted to enable a balanced transmission of 1's and 0's.

In summary, if disparity of a current word is positive (i.e. number of 1's>number of 0's) and the disparity of the next word is also positive (number of 1's>of the number of 0's), then each bit of the data or control word is inverted and additional bit is set as 1. If disparity of current word is negative (i.e. number of 0's>number of 1's) and disparity of the next word is also negative (i.e. number of 0's>number of 1's), then each bits of the data or control word is inverted and additional bit is set as 1. If disparity of current word is positive (i.e. number of 1's>number of 0's) and next disparity of the word disparity is negative (i.e. number of 0's>number of 1's), then each bit of the data or control word is not inverted and the additional bit is set as 0. If disparity of current word is negative (i.e. number of 0's>number of 1's) and next disparity of the word is also positive (i.e.

number of 1's>number of 0's), then each bits of the data or control word is not inverted and additional bit is set as 0. Therefore, if more 1's are transmitted in word n, and word n−1 also has more 1's than 0's, then the bits of the n+1 th word are inverted so that the number of zeros become more than number of 1's.

Figure 7:
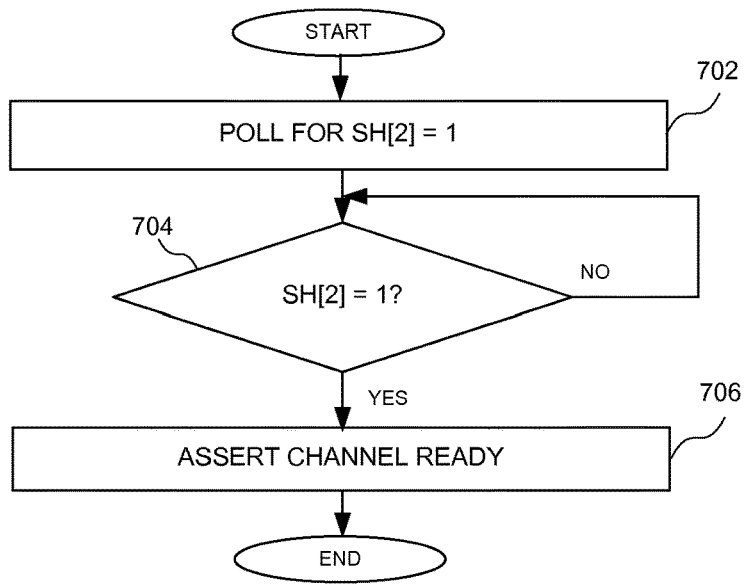
FIG. 7 is a flow chart showing a method of providing remote verification.

As shown in the flow chart of FIG. 7, a channel ready signal is asserted when it is determined that the channels are aligned after de-skewing is complete. More particularly, when the remote partner has completed a link de-skewing stage, it sets SH[2] to 1 to indicate to the link partner that it is ready to receive data. Therefore, the receiver checks for an SH[O]=1 signal at a block 702. If it is determined that the SH[2] signal is equal to 1 at a block 704, a channel ready signal is asserted at a block 706. That is, a link partner issues a channel ready signal once remote partner ready verification is performed.

FIGS. 8-10 show examples of the use of the synchronization header bits during data transmission. The examples of FIG. 8-10 include 67 bits in a block, including 3 synchronization bits, which is similar to 64B/66B encoding having 66 bits but with the synchronization header having just one additional bit. The additional synchronization header bit SH[2] (i.e. bit 66 of the example of FIGS. 8-10) is used to convey remote ready information to a link partner during initialization. The SH[2] bit will be 0 during the time when remote is not ready (i.e. when channel alignment has not been established in the remote). When channel alignment is established, this bit is asserted 1. As shown in FIG. 8, five consecutive data blocks that are transmitted have the "10, 10,10,10, 01" pattern in bits 64 and 65, where link alignment can be established by the detection of the "01" bits in the fifth block. After link alignment is established where bit 66 is then changed to a "1" as shown in FIG. 9, bits 64 and 65 are set to "10" when transmitting a control word and to a "10" when transmitting data. Link initialization, the SH[2] bit is used to convey the parity information of the 64 bit word as shown in the example of FIG. 10. If it later determined that a remote is not ready, information can be communicated during data transfer indicating the link is not ready. For example, the link partner could transmit invalid SH bits (bits 64 and 65 as "11" or "00" for example), which would allow the receiver to lose lock and enable link initialization to be retriggered.

In absence of traffic from a user application, the serial communication protocol defines IDLE control word to be transmitted to the link partner. The IDLE control word does not need to be decoded and the remote partner can identify an IDLE control word with SH [2] bit. In the user traffic, SH [2] may toggled in the consecutive words to define the parity of the received word as shown in FIG. 10. In case of IDLE transmission, SH [2] is always set to 1 which indicates that the remote is still ready and the traffic is meant to be ignored by the link partner.

Figure 11:
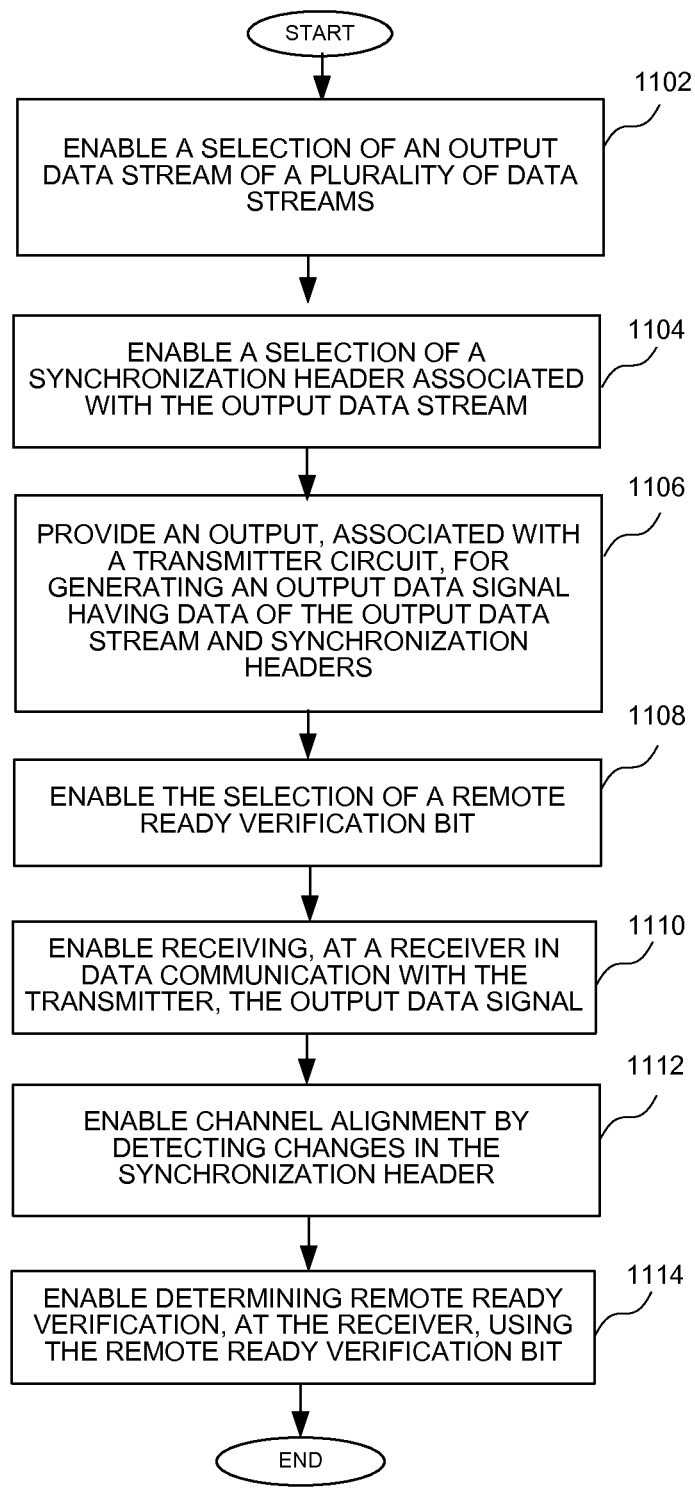
FIG. 11 is a flow chart showing a method of enabling the communication of data in a communication link of a communication network.

Turning now to FIG. 11, a flow chart shows a method of enabling the communication of data in a communication link of a communication network. In particular, a selection of an output data stream of a plurality of data streams is enabled at a block 1102. The selection may be performed by the multiplexer circuit 308 for FIG. 3. A selection of a synchronization header associated with the output data stream is enabled at a block 1104, such as by the selection circuit 336 for example. An output, associated with a transmitter circuit, for generating an output data signal having data of the output data streams (i.e. Data_0, Data_1 . . . Data_n) and synchronization headers is provided at a block 1106. The selection of a remote ready verification, such as by the selection circuit 353 for example, is enabled at a block 1108. The output data signal, which is a serial data stream having data of the plurality of output data streams, is enabled to be received at a receiver, such as the receiver of FIG. 4 for example in data communication with the transmitter, at a block 1112. Channel alignment is enabled by detecting changes in the synchronization header at a block 1114. Remote ready verification is enabled to be determined, at the receiver, using the remote ready verification bit at a block 1116. Remote ready verification can be determined using an additional bit (e.g. bit 66 in the example of FIGS. 8-10) during link initialization. The additional bit can then be used for another purpose, such as establishing parity, after link initialization.

The various elements of the methods of FIGS. 5, 6, 7, and 11 may be implemented using the circuits of FIGS. 1-4 as described, or using some other suitable circuits. While specific elements of the method are described, it should be understood that additional elements of the method, or additional details related to the elements, could be implemented according to the disclosure of FIGS. 1-4 or other figures.

Figure 12:
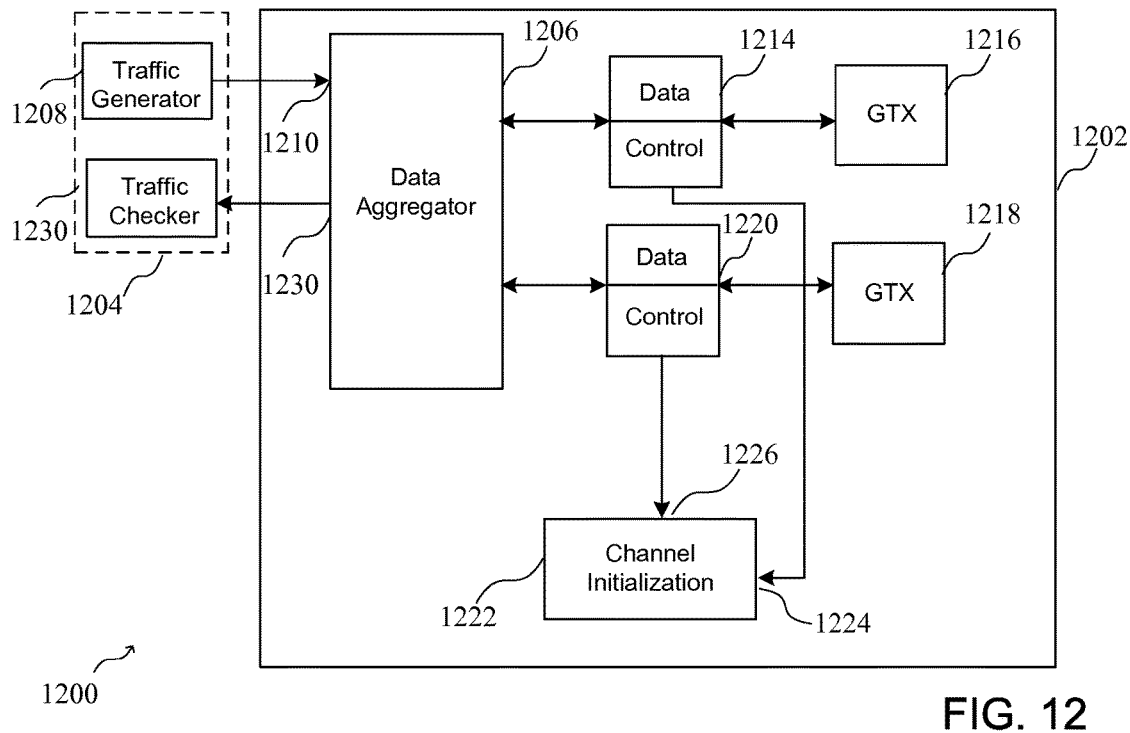
FIG. 12 is a block diagram showing a device under test.

Turning now to FIG. 12, a block diagram shows a device under test is shown. An integrated circuit device 1202 that is under test 1200 is coupled to test equipment 1204 as shown in FIG. 12. The integrated circuit device 1202 comprises a data aggregator 1206 coupled to a traffic generator 1208 to receive test data at an input 1210. The data aggregator 1206 provides data to a control circuit 1214, which generates control and data test signals to a transceiver 1216 operating as a receiver. That is, the integrated circuit device 1202 comprises a plurality of transceivers, where one of the transceivers is implemented as a receiver to receive test inputs and another transceiver is implemented as a transmitter to provide return data to the test equipment. Accordingly, the data aggregator also receives data from a second transceiver 1218 functioning as a transmitter by way of a second control circuit 1220. A channel initialization block 1222 receives outputs of the control circuit 1214 at a first input 1224 and outputs of the control circuit 1220 at a second input 1226. The channel initialization circuit is used to enable the control circuit and data transceivers to transmit and receive data in order to test the operation of the transceivers. An output of the data aggregator 1206 generated at an output 1230 is coupled to a traffic checker 1232.

The transceiver 1216 and 1218 may be GTXE2 transceivers present in Xilinx 7 Series FPGAs, for example. The transceivers performs parallel-to-serial conversion when transmitting and serial-to-parallel conversion receiving. FIG. 4 shows the standalone block diagram of the serial communication protocol IP. The following sections describe the protocol layers implemented in the FPGA fabric.

During the testing process, the traffic generator sends a periodic sequence of 64 bit control words and the SH bits. Two of SH bits, such as bits 64 and 65, follow the pattern "10, 10, 10, 10, 01" periodically so as to ensure channel alignment in the receiver. The receiver performs block boundary alignment by verifying the valid SH bit pattern. Handshaking is performed with the receiver to enable circular shifting of the received data if an invalid SH sequence is detected. Once the receiver detects a valid SH pattern consistently, it issues a link alignment signal.

The receiver transitions from the idle state once all links are aligned and checks for periodic SH pattern: 10, 10, 10, 10, 01. Channel misalignment is detected if the received pattern from all links does not follow the same pattern. Depending on the occurrence of SH=01 bits across all the links, adjustments of data path delays of each of the receive links are made. The received data from each link is passed through a programmable delay block, where the delay value is programmed dynamically based on the position of the SH=01 pattern is set fourth.

The channel alignment signal is asserted once the delay value of all the links is programmed. The final stage of the link alignment process is the verification of remote readiness which is performed by checking SH [2] bit in the received pattern. A channel ready signal is asserted if SH [2] is asserted high for two clock cycles. The user interface can start sending and receiving data once the channel ready signal is asserted.

Figure 13:
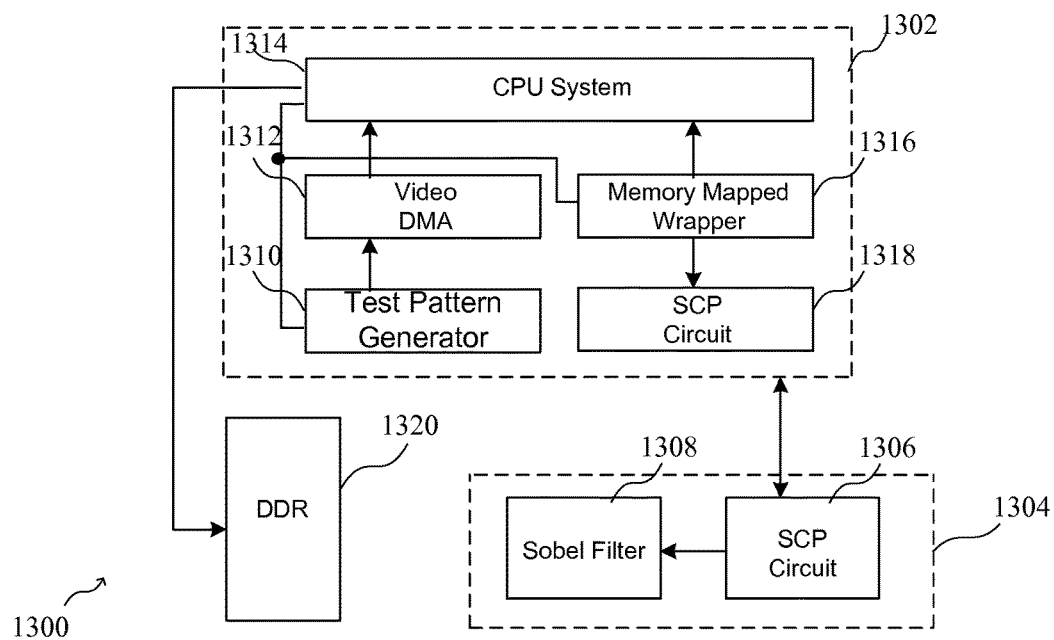
FIG. 13 is a block diagram of a system level implementation having devices enabling the communication of data in a communication link of a communication network.

Turning now to FIG. 13, a block diagram of a system level implementation 1300 having devices enabling the communication of data in a data link of a communication network is shown. In particular, a first programmable logic device 1302 implementing a serial communication protocol is coupled to a second programmable logic device 1304 having a serial communication protocol circuit 1306 coupled to a Sobel filter 1308. A test pattern generator 1310 is coupled to a video direct memory access (VDMA) circuit 1312. The programmable logic device 1302 also comprises a CPU system 1314 coupled to the VDMA circuit 1312 and to a memory mapped wrapper 1316 that receives an output of test pattern generator and is coupled to a serial communication protocol circuit 1318. A system memory 1320, such as a double data rate (DDR) memory, is also coupled to the CPU system.

The test pattern generator (1310) is capable of generating a video test pattern with programmable resolution. The output of the test pattern generator is copied by the VDMA circuit to the system memory 1320. The CPU system can read the video frames from the system memory and performs a Sobel operation and stores back in the system memory. A display module, that may have an Advanced Extensible Interface 4 (AXI4) memory mapped interface for example, can be used to read the processed frames from the system memory and display the processed frames on the external display devices.

Due to the limiting processing power of low cost processors that may be used in a system-on-a-chip (SOC), a compute intensive operation may have to be performed in hardware to meet a system level performance requirement. Sobel filtering may be used for image edge detection, and may require multiplication and accumulation to be performed recursively across all image pixels. The Sobel filter 1308 may be generated using High Level Synthesis flow which converts a C-based Sobel algorithm to RTL. The Sobel filter may have an AXI4 Stream interface and can interface with an SCP circuit directly. A memory mapped wrapper may be used to fetch the video packets from pre-defined DDR addresses and provide the frames to the AXI4 Stream interface of SCP circuit. The communication between the two chips happen over the high speed serial I/O links connecting the SCP circuits 1318 and 1306.

The Sobel filter circuit 1308 preferably uses a fixed row and column offset to calculate the edge of the output image. The processor configures the test pattern generator for a specific resolution value and programs the VDMA circuit to store the frames from in the DDR memory. Once the frame is stored in the DDR memory, the processor can write the Sobel filter configuration sequence in the DDR memory just before the video frame packet, and instruct the memory mapped wrapper circuit to start fetching the frames from the DDR memory. The memory mapped block sends the Sobel filter configuration data with SH bits set to 10 in the SCP interface and transmits the actual video frames with SH bits set to 01. The logic in the other FPGA device decodes the SH bits to identify the configuration data from the video data. The Sobel filter is preferably configured first and the actual video stream is processed subsequently. After Sobel processing, the frames are stored in DDR memory using the SCP links between the SCP circuits 1306 and 1318, and the Sobel block is ready to process the next frame.

It can therefore be appreciated that new circuits for and methods of enabling the communication of data in a communication link associated with a data communication network has been described. It will be appreciated by those skilled in the art that numerous alternatives and equivalents will be seen to exist that incorporate the disclosed invention. As a result, the invention is not to be limited by the foregoing embodiments, but only by the following claims.

What is claimed is:

1. A circuit for enabling the communication of data in a communication link associated with a data communication network, the circuit comprising:
   a data generation circuit having a plurality of inputs configured to receive a plurality of data streams and a control input configured to receive a data control signal, the data generation circuit generating an output data stream;
   a control signal generator having a plurality of inputs configured to receive a plurality of synchronization headers and a control input configured to receive a synchronization header control signal for selecting a synchronization header of the plurality of synchronization headers;
   a serializer circuit configured to receive the output data stream from the data generation circuit and the selected synchronization headers from the control signal generator, wherein the serializer circuit generates, at an output, an output data signal having blocks each comprising data of the output data stream and a synchronization header; and
   a control circuit configured to generate the data control signal and the synchronization header control signal to control the data generation circuit and the control signal generator to form the blocks comprising data of the output data stream and a synchronization header, wherein the control circuit enables, for each data stream of the plurality of data streams, a selection of the synchronization headers of the output data signal to enable channel alignment of the communication link.

2. The circuit of claim 1 wherein the data generation circuit is configured to receive an idle data pattern at an input of the plurality of inputs.

3. The circuit of claim 1 further comprising a scrambler circuit coupled to an output of the data generation circuit, the scrambler circuit enabling selected data generated at an output of the data generation circuit to have an approximately even distribution of ones and zeros.

4. The circuit of claim 1 wherein the serializer circuit is configured to receive a remote ready verification signal.

5. The circuit of claim 4 further comprising a second selection circuit configured to receive a plurality of remote ready verification signals at a plurality of inputs and a second synchronization header control signal, from the control circuit, at a selection input.

6. The circuit of claim 4 wherein the remote ready verification signal is used as a parity bit for data generated by the serializer circuit after the communication link is initialized.

7. A circuit for enabling the communication of data in a communication link associated with a data communication network, the circuit comprising:
- a data generation circuit configured to receive a plurality of data streams and generate an output data stream;
- a control signal generator configured to generate synchronization headers:
- a serializer circuit configured to receive the output data stream from the data generation circuit and the synchronization headers from the control signal generator, wherein the serializer circuit generates, at an output, an output data signal having data of the output data stream and the synchronization headers;
- a control circuit configured to control the data generation circuit and the control signal generator, wherein the control circuit enables, for each data stream of the plurality of data streams, a selection of the synchronization headers of the output data signal to enable channel alignment of the communication link;
- a deserializer circuit having an input for receiving an input data signal; and
- a second control circuit coupled to the deserializer circuit and having a first input configured to receive synchronization headers associated with the input data signal;
- wherein the second control circuit generates a control signal indicating that a channel initialization is complete based upon the synchronization headers.

8. The circuit of claim 7 wherein the second control circuit comprises a block synchronization circuit having an input coupled to receive the synchronization headers.

9. The circuit of claim 8 wherein the second control circuit further comprises a link initialization circuit coupled to receive the synchronization headers and a block lock signal from the block synchronization circuit.

10. The circuit of claim 9 wherein the link initialization circuit detects a change in the synchronization headers and generates an alignment signal in response to the change in the synchronization headers.

11. The circuit of claim 10 wherein the deserializer circuit is associated with a receiver of a transceiver, and the alignment signal is provided to a transmitter of the transceiver.

12. The circuit of claim 7 wherein the deserializer circuit generates a plurality of parallel output data signals.

13. The circuit of claim 12 further comprising a plurality of descrambler circuits, where each descrambler circuits of the plurality of descrambler circuits generates an output data signal of the plurality of parallel output data signals.

14. A method of enabling the communication of data in a communication link associated with a data communication network, the method comprising:
- enabling a selection by a control circuit of data of a plurality of data streams, coupled to a plurality of inputs of a data generation circuit, to generate an output data stream;
- enabling, for each data stream of the plurality of data streams, a selection by the control circuit of a synchronization header of a plurality of synchronization headers coupled to a plurality of inputs of a control signal generator, wherein the control signal generator receives a synchronization header control signal from the control circuit to enable channel alignment of the communication link;
- forming blocks comprising data of the output data stream and a synchronization header; and
- generating an output data signal, associated with a transmitter circuit, having the blocks comprising data of the output data stream and a synchronization header.

15. The method of claim 14 further comprising enabling a selection of a remote ready verification signal.

16. The method of claim 15 wherein generating an output data signal comprises generating an output data signal having data of the output data stream, the selected synchronization headers and the selected remote ready verification signals.

17. The method of claim 16 further comprising receiving the output data signal at a receiver.

18. The method of claim 17 further comprising enabling channel alignment of the communication link by detecting changes in the synchronization headers.

19. The method of claim 17 further comprising enabling determining remote ready verification, at the receiver, based upon the remote ready verification signals.

* * * * *